Figure 2B:
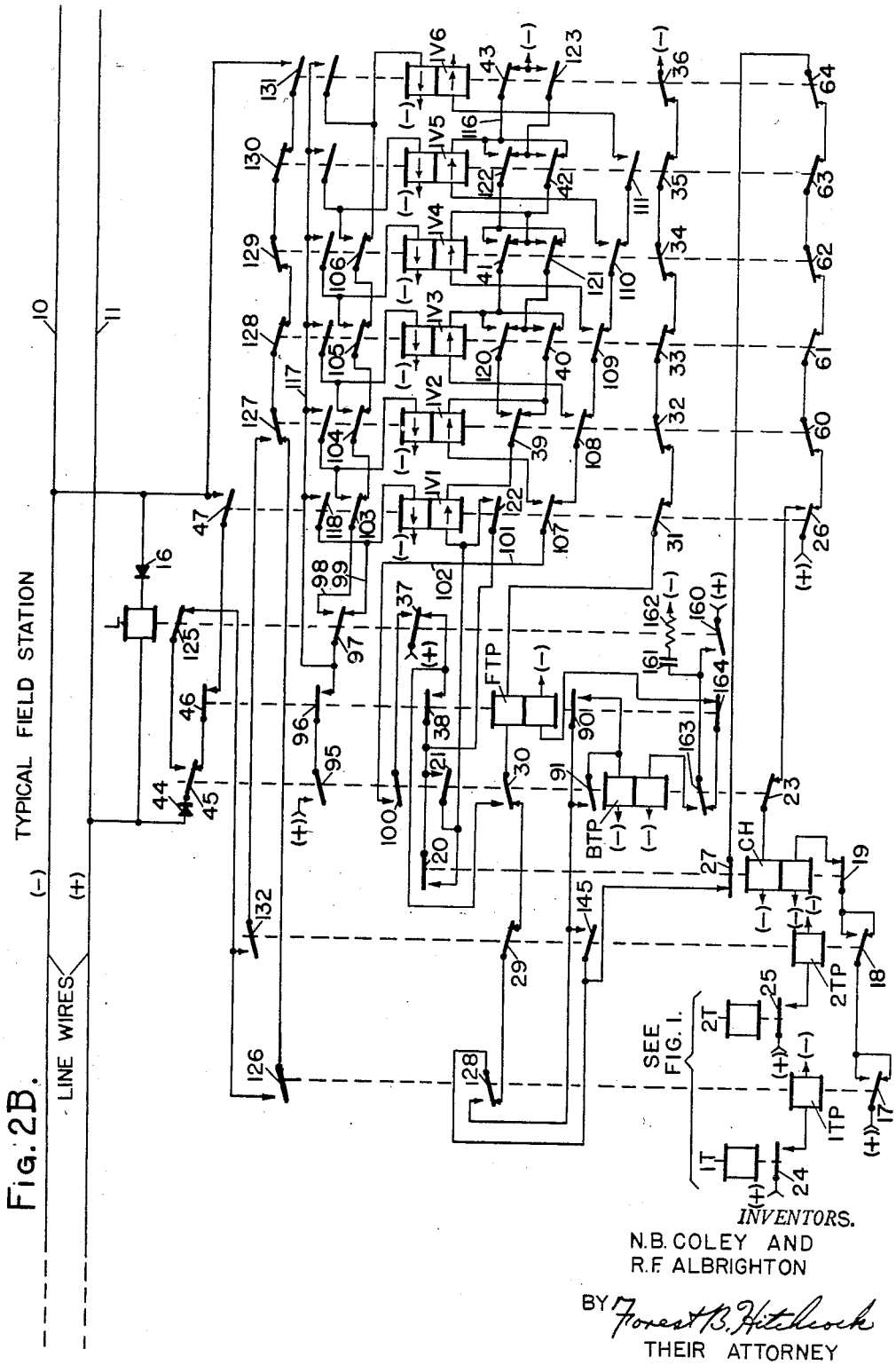

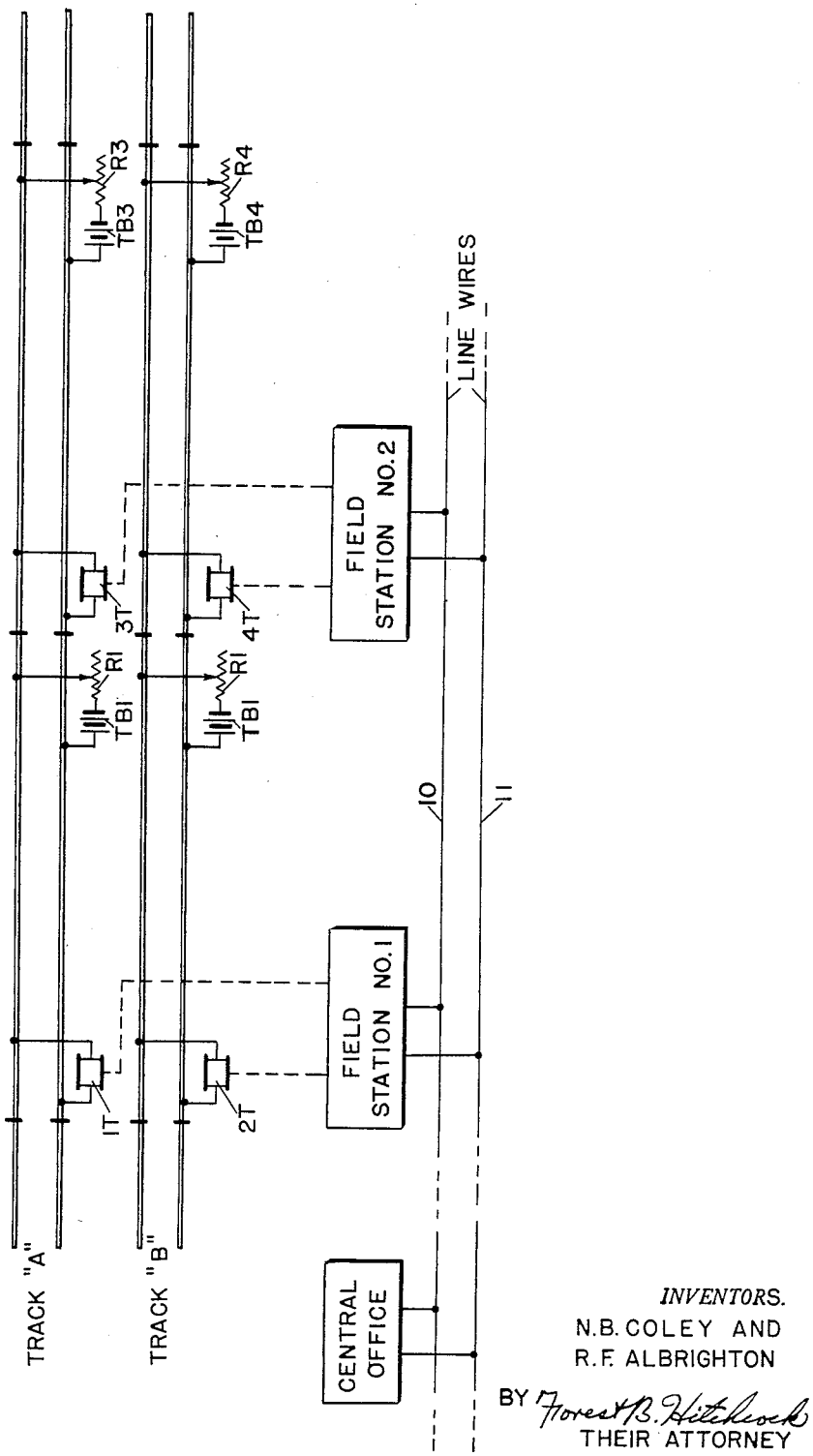

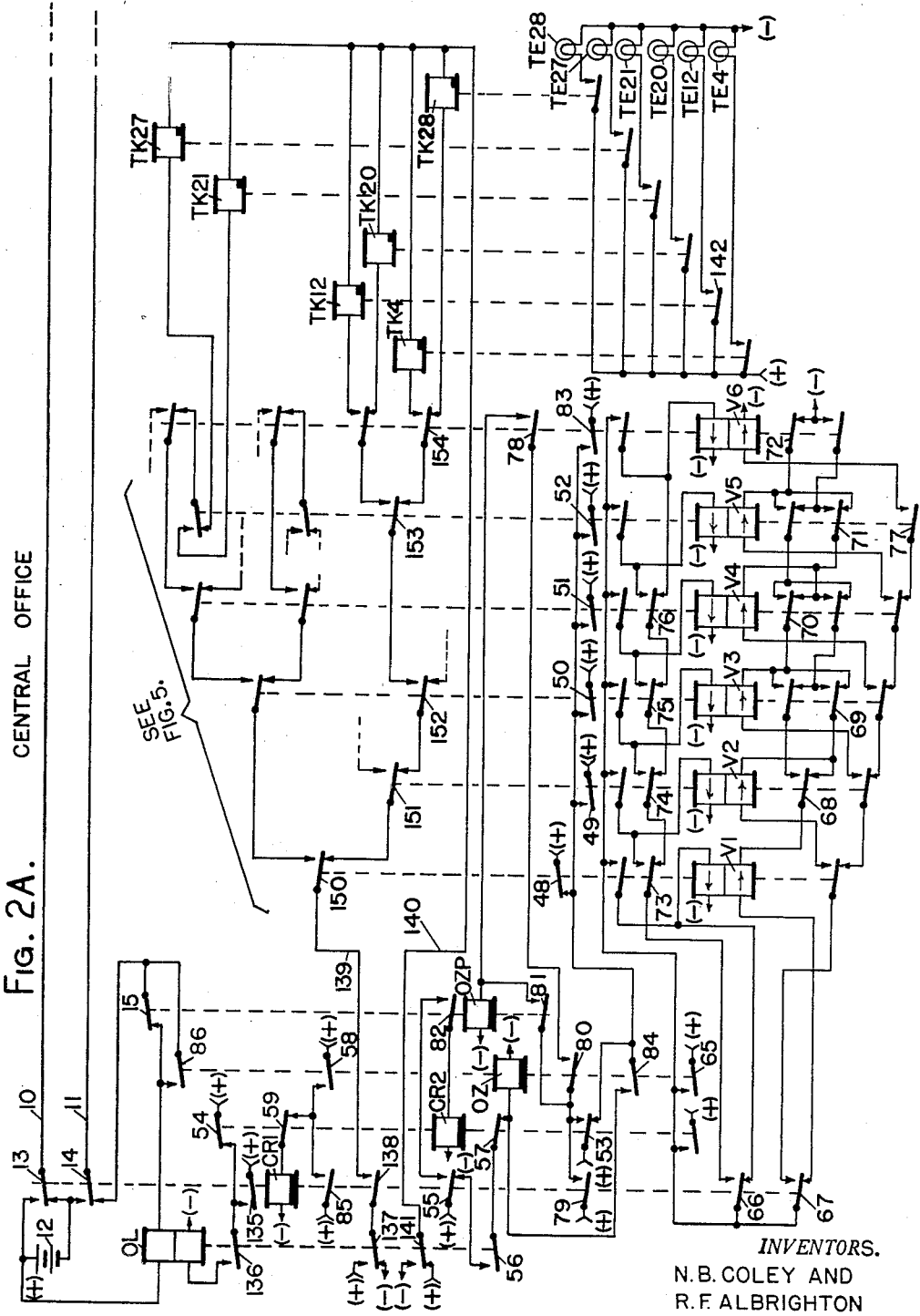

Dec. 30, 1958 N. B. COLEY ET AL 2,866,963
CODE COMMUNICATION SYSTEM
Filed Dec. 11, 1953 6 Sheets-Sheet 4

INVENTORS.
N. B. COLEY AND
R. F. ALBRIGHTON
BY Forest B. Hitchcock
THEIR ATTORNEY

Fig. 4.

CODE CHART

| CR | COUNTING RELAYS | | | | | | STEP NO. |
|---|---|---|---|---|---|---|---|
| | 1 | 2 | 3 | 4 | 5 | 6 | |
| | ↑ | ↓ | ↓ | ↓ | ↓ | ↓ | 1 |
| | ↓ | ↓ | ↓ | ↓ | ↓ | ↑ | 2 |
| | ↑ | ↓ | ↓ | ↓ | ↓ | ↑ | 3 |
| | ↓ | ↓ | ↓ | ↓ | ↓ | ↑ | 4 |
| | ↑ | ↓ | ↓ | ↑ | ↓ | ↓ | 5 |
| | ↓ | ↑ | ↓ | ↑ | ↓ | ↑ | 6 |
| | ↑ | ↑ | ↓ | ↑ | ↓ | ↓ | 7 |
| | ↓ | ↓ | ↑ | ↓ | ↓ | ↑ | 8 |
| | ↑ | ↓ | ↑ | ↑ | ↓ | ↓ | 9 |
| | ↓ | ↑ | ↓ | ↑ | ↓ | ↑ | 10 |
| | ↑ | ↑ | ↑ | ↑ | ↓ | ↓ | 11 |
| | ↓ | ↓ | ↑ | ↑ | ↓ | ↓ | 12 |
| | ↑ | ↓ | ↓ | ↑ | ↓ | ↓ | 13 |
| | ↓ | ↑ | ↓ | ↓ | ↓ | ↑ | 14 |
| | ↑ | ↑ | ↓ | ↓ | ↓ | ↓ | 15 |
| | ↓ | ↓ | ↓ | ↓ | ↑ | ↓ | 16 |
| | ↑ | ↓ | ↓ | ↓ | ↑ | ↓ | 17 |
| | ↓ | ↑ | ↓ | ↓ | ↑ | ↑ | 18 |
| | ↑ | ↑ | ↑ | ↓ | ↑ | ↓ | 19 |
| | ↓ | ↓ | ↑ | ↓ | ↑ | ↑ | 20 |
| | ↑ | ↓ | ↑ | ↓ | ↑ | ↓ | 21 |
| | ↓ | ↑ | ↑ | ↓ | ↑ | ↑ | 22 |
| | ↑ | ↑ | ↑ | ↓ | ↑ | ↓ | 23 |
| | ↓ | ↓ | ↓ | ↑ | ↑ | ↑ | 24 |
| | ↑ | ↓ | ↓ | ↑ | ↑ | ↓ | 25 |
| | ↓ | ↑ | ↓ | ↑ | ↑ | ↑ | 26 |
| | ↑ | ↑ | ↓ | ↑ | ↑ | ↓ | 27 |
| | ↓ | ↓ | ↑ | ↑ | ↑ | ↑ | 28 |
| | ↑ | ↓ | ↑ | ↑ | ↑ | ↓ | 29 |
| | ↓ | ↑ | ↑ | ↑ | ↑ | ↑ | 30 |
| | ↑ | ↑ | ↑ | ↑ | ↑ | ↓ | 31 |
| | ↓ | ↓ | ↓ | ↓ | ↓ | ↓ | 32 |

| CR | COUNTING RELAYS | | | | | | STEP NO. |
|---|---|---|---|---|---|---|---|
| | 1 | 2 | 3 | 4 | 5 | 6 | |
| | ↑ | ↓ | ↓ | ↓ | ↓ | ↑ | 33 |
| | ↓ | ↑ | ↓ | ↓ | ↓ | ↑ | 34 |
| | ↑ | ↑ | ↓ | ↓ | ↓ | ↑ | 35 |
| | ↓ | ↓ | ↑ | ↓ | ↓ | ↑ | 36 |
| | ↑ | ↓ | ↑ | ↓ | ↓ | ↑ | 37 |
| | ↓ | ↑ | ↑ | ↓ | ↓ | ↑ | 38 |
| | ↑ | ↑ | ↓ | ↓ | ↑ | ↑ | 39 |
| | ↓ | ↓ | ↓ | ↑ | ↓ | ↑ | 40 |
| | ↑ | ↓ | ↓ | ↑ | ↑ | ↑ | 41 |
| | ↓ | ↑ | ↓ | ↑ | ↑ | ↑ | 42 |
| | ↑ | ↑ | ↓ | ↑ | ↑ | ↑ | 43 |
| | ↓ | ↓ | ↑ | ↑ | ↑ | ↑ | 44 |
| | ↑ | ↓ | ↑ | ↑ | ↑ | ↑ | 45 |
| | ↓ | ↑ | ↑ | ↑ | ↑ | ↑ | 46 |
| | ↑ | ↑ | ↓ | ↑ | ↑ | ↑ | 47 |
| | ↓ | ↓ | ↓ | ↓ | ↑ | ↑ | 48 |
| | ↑ | ↓ | ↓ | ↓ | ↑ | ↑ | 49 |
| | ↓ | ↑ | ↓ | ↓ | ↑ | ↑ | 50 |
| | ↑ | ↑ | ↓ | ↓ | ↑ | ↑ | 51 |
| | ↓ | ↓ | ↑ | ↓ | ↑ | ↑ | 52 |
| | ↑ | ↓ | ↑ | ↓ | ↑ | ↑ | 53 |
| | ↓ | ↑ | ↑ | ↓ | ↓ | ↑ | 54 |
| | ↑ | ↑ | ↑ | ↓ | ↓ | ↓ | 55 |
| | ↓ | ↓ | ↓ | ↑ | ↓ | ↑ | 56 |
| | ↑ | ↓ | ↓ | ↑ | ↓ | ↓ | 57 |
| | ↓ | ↑ | ↓ | ↑ | ↓ | ↓ | 58 |
| | ↑ | ↑ | ↑ | ↓ | ↓ | ↓ | 59 |
| | ↓ | ↓ | ↑ | ↑ | ↓ | ↓ | 60 |
| | ↑ | ↓ | ↑ | ↓ | ↓ | ↓ | 61 |
| | ↓ | ↑ | ↑ | ↓ | ↓ | ↓ | 62 |
| | ↑ | ↑ | ↑ | ↓ | ↓ | ↓ | 63 |
| | ↓ | ↓ | ↓ | ↓ | ↓ | ↓ | 64 |

NOTE:
NORMAL POSITION OF RELAYS
CORRESPONDS TO STEP NO. 64

↑ = RELAY PICKED UP
↓ = RELAY DROPPED AWAY

*INVENTORS.*
N. B. COLEY AND
R. F. ALBRIGHTON

BY *Forest B. Hitchcock*
THEIR ATTORNEY

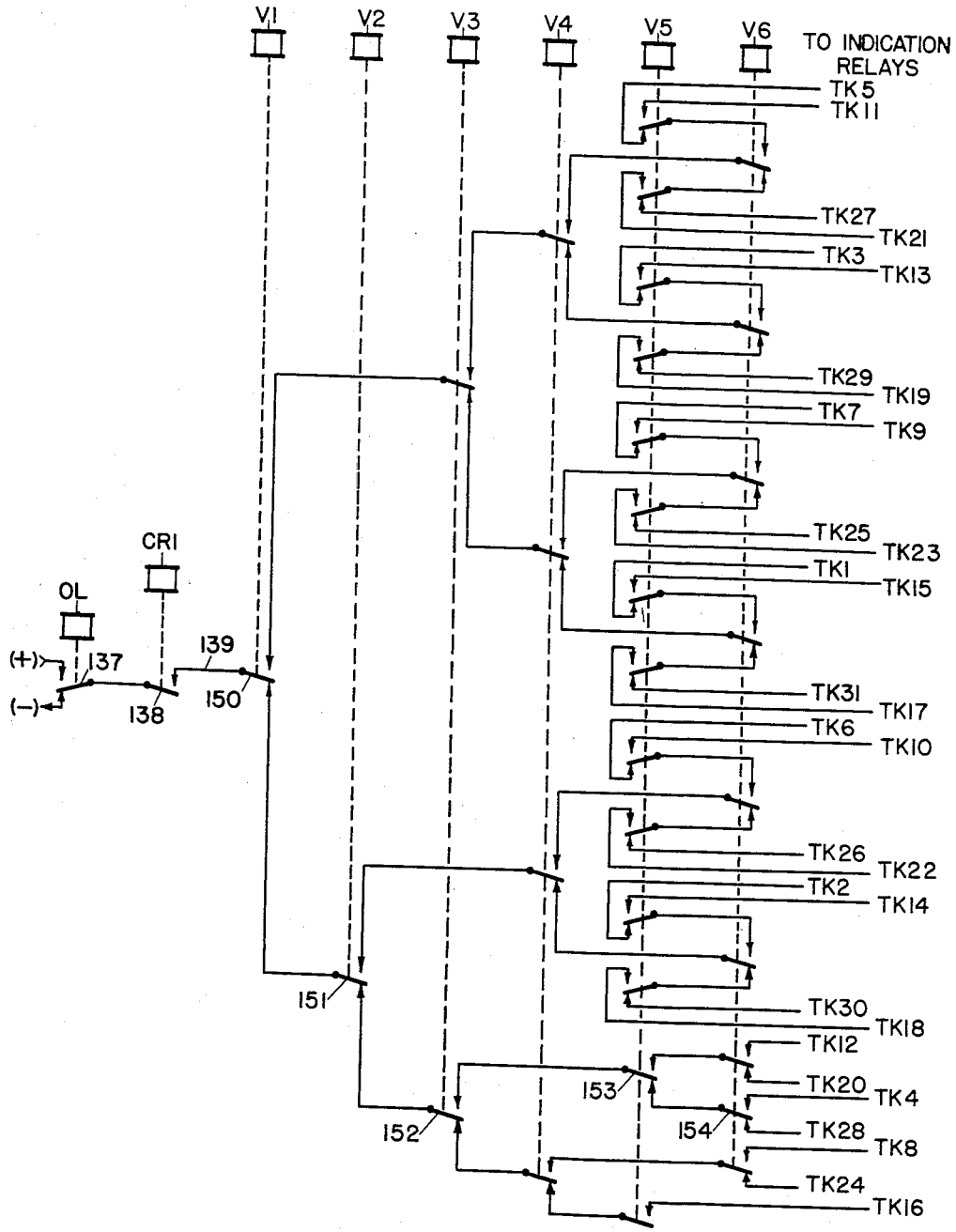

United States Patent Office 2,866,963
Patented Dec. 30, 1958

2,866,963

CODE COMMUNICATION SYSTEM

Nelson B. Coley and Reginald F. Albrighton, Rochester, N. Y., assignors to General Railway Signal Company, Rochester, N. Y.

Application December 11, 1953, Serial No. 397,650

4 Claims. (Cl. 340—150)

This invention relates to a code communication system and more particularly pertains to a shunt type, direct-current code communication system for the transmission of indications from a plurality of field stations to a central office over a pair of line wires.

The features herein disclosed, which relate to stepping relay banks per se, are disclosed and claimed in our divisional application Ser. No. 734,025, filed May 8, 1958.

The code communication system of this invention provides an economical, all-relay means for transmitting indications to a central office. It is particularly useful, therefore, in transferring track occupancy conditions of a stretch of railway track to a central location. Such received indications may be used to control associated apparatus and/or may be visually displayed.

Describd briefly, this system is of the kind generally known as a scanning system in that it is initiated into operation when a change occurs at any field station and then operates through a complete cycle in which every field station is "scanned" to ascertain what the conditions then are at each field station.

The line wires are normally energized at the central office with direct current of a particular polarity, and a cycle of operation is initiated by a line shunt applied at a field station where a change in condition has occurred. For example, when a train enters a track section and causes the associated track relay to drop away, a shunt is momentarily applied to the line wires at the particular field station related to that track section to indicate thereby that a change in conditions has occurred. In response to such shunt, the control office causes a train of code pulses to be applied to the line wires by alternately and successively changing the polarity of the voltage applied to the line wires. To transmit one kind of indication, such as occupancy of a certain track section, a field station shunts the line wires during the particular digit of the cycle assigned to that station. A different kind of indication, such as non-occupancy of the same track section, may be made effective at the central office by the failure of a station to apply a line shunt on its assigned code digit.

When any field station desires to apply a line shunt, it knows on which code digit the shunt should be applied by counting, from the beginning of a cycle, the number of polarity reversals that have occurred. Of course, when a field station does not desire to apply a line shunt during a particular cycle of operation, it is unnecessary at that station to count the digits in the cycle, and the counting means at such station is, herefore, made inoperative for that cycle.

The change of line current caused by a field station shunt occurring on a particular code digit is detected at the control office. Because counting means, similar to that provided at each field station, is also provided at the control office, the information as to whether or not a line shunt was detected on any step of the cycle is properly routed to the indication storage means for the corresponding field station. This storage means may be made effective to cause a visual display of the stored information constituting track occupancy conditions at the various field stations.

A field station may be so organized that it will cause a single indication to be transmitted to the central office on a preslected digit of the code cycle. Alternatively, the field station apparatus may be organized so that two or more indications are transmitted, each on a different step of the cycle.

The counting means provided at the central office and at each field station comprises what may be termed a relay binary counter. In counting a number of input counts equal to the capacity of the counter, the various counting relays collectively assume all possible permutations of their conditions so that $(2^n-1)$ represents the number of distinct inputs that may be counted using only $n+1$ relays.

It is an object of this invention to provide an economical and reliable all-relay code communication system whereby indications may be transmitted from a plurality of field stations to a central office.

It is another object of this invention to provide a line wire communication system comprising a relay binary counter requiring a minimum number of relays.

Another object of this invention is to provide, in a code communication system, a relay binary counter and associated selecting network so organized as to facilitate the reception of indications from the field stations.

Another object is to provide a circuit organization at each field station in which the failure of any field station counter to count properly during a cycle for any reason, such as line distortion of the received code, results in the counter's being restored so that it can properly count on the next cycle.

Other objects, purposes, and characteristic features of this invention are in part obvious from the accompanying drawings and in part pointed out as the description of the invention progresses.

Figure 3:
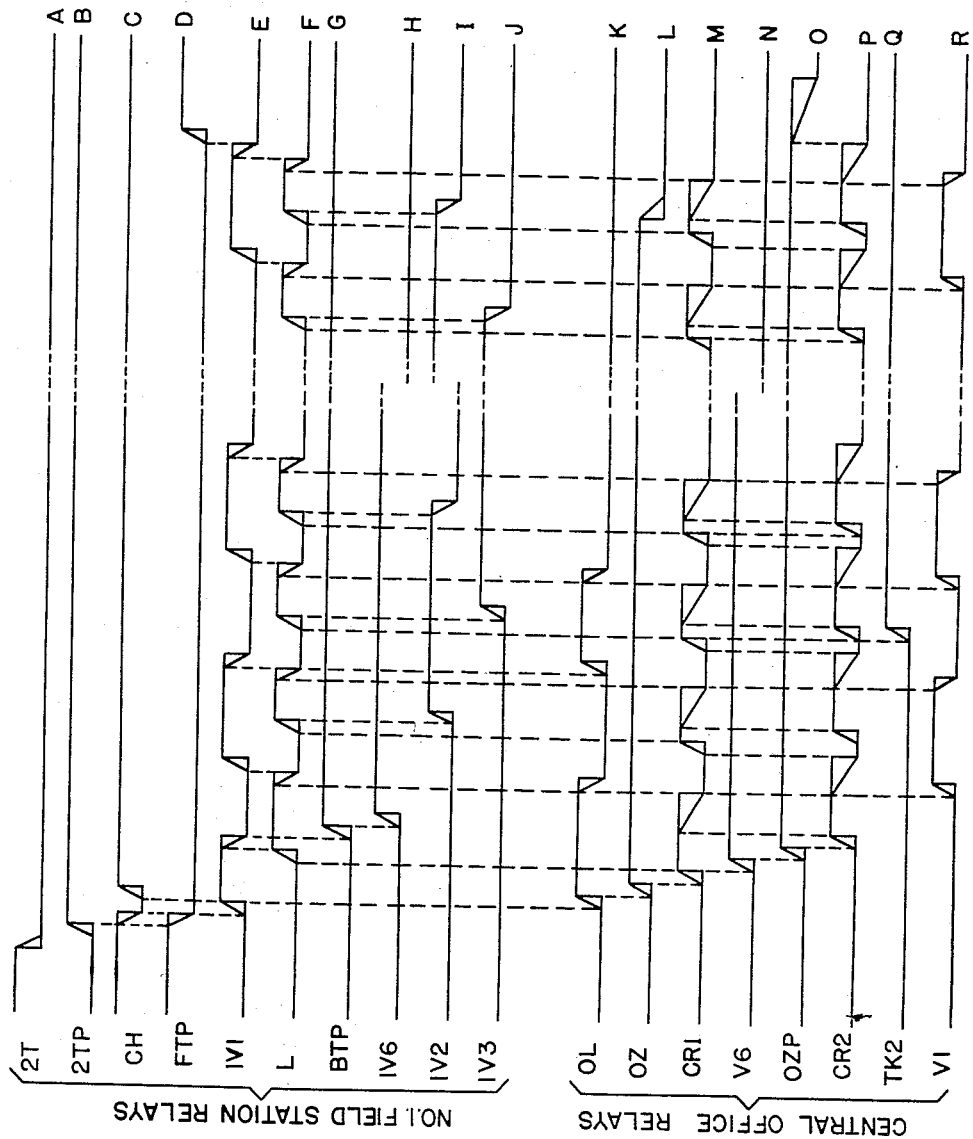
Figure 3A:
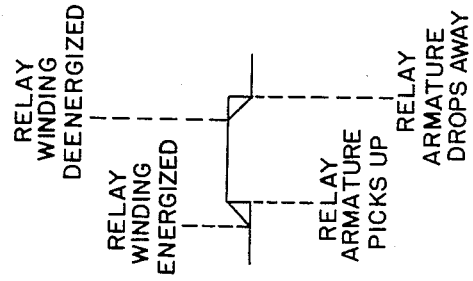

In describing this invention in detail, reference is made to the accompanying drawings in which like reference characters designate corresponding parts throughout the several views, and in which:

Fig. 1 is a diagram illustrating how the code communication system of this invention may be used in transferring track occupancy conditions over a section of railroad to a central office;

Figs. 2A and 2B, when placed side by side, comprise a circuit diagram showing in detail a circuit organization of the central office apparatus of this invention and also the appartus at a typical field station;

Figs. 3 and 3A comprise a timing chart which indicate the sequence of relay operations in a typical cycle of operation;

Fig. 4 illustrates in tabular form the sequence of relay operations of the relay binary counter used in the code communication system of this invention; and Fig. 5 shows the arrangement of the selecting network used in the system of this invention to facilitate the reception of indications from the various field stations.

To simplify the illustrations and facilitate the explanation of this invention, the various parts and circuits are shown diagrammatically, and certain conventional illustrations are used. The various relays and contacts are illustrated in a conventional manner, and the symbols (+) and (—) are used to indicate connections to the opposite terminals of a battery or other source of direct current instead of showing all of the connections to these terminals.

GENERAL ORGANIZATION

Fig. 1 illustrates diagrammatically the manner in which track occupancy conditions may be transferred by means of the code communication system of this invention to a central office. Two parallel tracks are shown, each divided into a plurality of track sections. Each track section has a track battery TB connected across the rails at one end thereof through a variable current-limiting resistor R. A track relay T is connected across the track rails at the other end of each track section.

Each track relay is normally energized by current supplied by the track battery and flowing down the track rails. The entrance of a train into a track section causes the associated track relay to drop away because the shunt path provided by the train deprives the track relay of its normal operating current. In this Fig. 1, each field station has associated with it two track relays, one for each of the two parallel tracks. Each of these field stations is, therefore, organized so as to be able to transmit an indication on either or both of two distinct steps of each indication cycle. Thus, a separate step of the cycle may be considered as being reserved for each indication to be transmitted. As will later be made clear, as many indications as desired may be transmitted from a single field station.

Each of the field stations shown diagrammatically in Fig. 1 is connected to the line wires 10 and 11 over which controls are transmitted to the central office. These line wires 10 and 11 are shown in Figs. 2A and 2B as being normally energized by a battery 12 located at the central office. Thus, the line wire 10 is connected through back contact 13 of relay CR1 to the negative terminal of battery 12, and line wire 11 is connected through back contact 14 of relay CR1, back contact 15 of relay OZP, and the upper winding of relay OL, to the positive terminal of battery 12. As a result, the line wires 10 and 11 are energized during a period of rest with a polarity of direct current that causes wire 10 to be of negative polarity with respect to wire 11.

At each field station such as that shown in Fig. 2B, a line relay L is connected across the line wires 10 and 11. The winding of this relay L has a rectifier 16 connected in series with it. The polarity of this rectifier is so chosen that it tends to prevent the flow of current through the winding of relay L for the normal polarity of energization of the line wires. Specifically, the positive polarity of voltage normally present on line wire 11 encounters the high back resistance of rectifier 16 so that only a very small amount of current can normally pass through the winding of relay L, and relay L is, therefore, normally in a dropped away condition as shown.

Each field station also includes a change relay CH which is normally picked up but drops away whenever a track repeater relay such as relay 1TP associated with track relay 1T is operated to its opposite condition. The dropping away of the change relay CH is, therefore, an indication that a change in track occupancy conditions has occurred and is effective, through related apparatus, to initiate an indication cycle by causing a shunt to be applied to the line wires at that location.

The relay FTP at each field station is picked up between cycles but is dropped away by the dropping away of the change relay CH at the beginning of a cycle. As a result, a shunt is applied to the line wires, and it is in response to this shunt that the central office begins its cyclical changing of line polarity as described previously.

Relay BTP at each field station is picked up only when one or more of the track sections associated with a field station is occupied. It is thus required that this relay be picked up in order that the counting means at a field station can be operative and a shunt applied to the line wires on a particular step of the cycle. In Fig. 2B, the track relays 1T and 2T are both shown picked up, thereby indicating that both associated track sections are unoccupied, and relay BTP is, therefore, shown as being dropped away.

Relays 1V1 to 1V6 are counting relays included in a binary counting circuit organization. The operation of this counter and also the similar binary counter in the central office comprising relays V1 to V6 will later be described in detail.

As described previously, the line wire circuit includes, at the central office, the upper winding of a shunt detecting relay OL. The amplitude of line current normally supplied by the battery 12 when no line shunt is being applied by a field station is lower than the pick-up value of current for relay OL so that relay OL is normally dropped away.

Relays CR1 and CR2 at the central office are included in a self-coding organization which causes the polarity of line energization to be alternated at a uniform rate. Relay OZ is picked up at the beginning of a cycle when the line is shunted by a field station where a change has occurred. This relay drops away at the end of a cycle when the binary counter has counted a number of steps corresponding to the number of indications that may be received so that relay OZ, in its picked up condition, demarcates the duration of a cycle of operation. Relay OZP is a repeater of relay OZ and drops away slowly at the end of a cycle to provide the desired minimum spacing between cycles.

Relays TK1 to TK32, of which only a representative few are shown in Fig. 2A, are indication storage relays of the magnetic stick type. These relays are selectively energized, one at a time, each upon the digit of the cycle assigned to the corresponding indication. The polarity of the energization applied to the winding of each indication storage relay is selected in accordance with whether or not a shunt was applied to the line wires by the associated field station. Because of the magnetic stick characteristics of these relays, they are actuated to one condition or the other in accordance with the polarity of their energization and are maintained in such condition until energized with the opposite polarity.

The field station of Fig. 2B includes track repeater relays 1TP and 2TP associated respectively with the track relays 1T and 2T. Since the corresponding track sections are assumed to be unoccupied, relays 1T and 2T are picked up and their open back contacts 24 and 25 respectively cause relays 1TP and 2TP to be dropped away. A circuit is provided through contacts of these repeater relays to maintain a stick circuit for the change relay CH energized. This circuit extends from (+), and includes back contact 17 of relay 1TP, back contact 18 of relay 2TP, front contact 19 of the change relay CH, and the lower winding of this relay CH, to the terminal (—).

MANNER OF OPERATION

Cycle start at field station

Any change in the conditions of the track relays 1T and 2T, whether it be the picking up or dropping away of either of these relays, causes the stick circuit for relay CH to be momentarily interrupted. If, for example, the track relay 1T drops away because its associated track circuit is occupied by a train (line A, Fig. 3), a circuit is then completed from (+), and through back contact 24 of relay 1T, to energize the winding of relay 1TP. During the time required for the contact 17 of relay 1TP to operate from its back to its front position, the stick circuit for relay CH is momentarily open and this relay then drops away (see line C of Fig. 3).

Relay FTP shown in Fig. 2B is normally energized when the system is at rest as has been previously stated. If it is assumed that both track relays 1T and 2T are in picked up conditions, then relay BTP is dropped away as shown in Fig. 2B. The circuit for the energization of the upper winding of relay FTP then extends from (+), and includes back contact 26 of counting relay 1V1, back contacts 60 to 64 of relays 1V2 to 1V6 respectively, front contact 27 of the change relay CH, back contact 28 of relay 1TP, back contact 29 of relay 2TP, back contact 30 of relay BTP, the upper winding of relay FTP, back contact 31 of relay 1V1, as well as back contacts 32, 33, 34, 35, and 36 of relays 1V2 to 1V6, inclusive.

Upon the picking up of relay 1TP, this circuit for energizing the upper winding of relay FTP is opened at the now open back contact 28 of relay 1TP. When relay FTP drops away, a circuit is completed to energize the lower winding of relay 1V1 and thereby cause this relay to pick up. This relay 1V1 is included with relays 1V2 to 1V6 in a relay binary counter organization. Each counting relay has two windings which are oppositely poled with respect to the direct current applied to them. Energization of either winding of a relay causes the relay armature to be picked up, but if both windings are simultaneously energized, the magneto-motive forces of the two windings, being of opposite polarity, cancel each other so that the net flux is zero and the relay armature is dropped away.

This circuit for picking up relay 1V1 extends from (+), and includes back contact 37 of relay L, back contact 38 of relay FTP, back contact 20 of relay CH, the lower winding of relay 1V1, and back contacts 39 to 43 of relays 1V2 to 1V6 respectively. This picking up of relay 1V1 in response to the dropping away of relay FTP is also shown diagrammatically in the timing chart of Fig. 3 at lines D and E.

The closure of front contact 26 of relay 1V1 causes a circuit to be completed from (+), through this front contact 26, back contact 23 of relay BTP, and the upper winding of relay CH, to (—). As soon as relay CH picks up (line C), it is maintained in this condition by a stick circuit including now front contact 17 of relay 1TP and back contact 18 of relay 2TP. Although back contact 20 of relay CH now is opened, the lower winding of relay 1V1 remains energized through its own front contact 22.

With relay 1V1 now picked up and relay FTP dropped away, a circuit is completed to shunt the line wires 10 and 11. This shunt circuit extends from the positive line wire 11, through rectifier 44 in the forward or low resistance direction, back contact 45 of relay BTP, back contact 46 of relay FTP, and front contact 47 of relay 1V1, to line wires 10. The establishing of this line shunt circuit is dependent upon the picking up of one of the normally deenergized field station relays, namely the first counting relay 1V1. Consequently, the failure of the local power source at a field station cannot cause a permanent shunt to be applied to the line at that location even though the relays FTP and BTP should be dropped away because, under those circumstances, the relay 1V1 would not pick up.

As a result of the application of a shunt to the line wires 10 and 11 at a field station, the current supplied by battery 12 at the central office (see Fig. 2A) is substantially increased. As a result, the current through the upper winding of relay OL is increased to a value exceeding the pick-up value of current for this relay so that relay OL picks up as diagrammatically illustrated at line K of Fig. 3. It will later be described in detail the manner in which this picking up of relay OL is effective to start an indication cycle at the central office.

It has been assumed in the detailed description given this far, that both track sections associated with the field station of Fig. 2B are unoccupied so that relay BTP is dropped away. If, on the other hand, one or more of these track sections had previously been occupied by a train, relay BTP would be picked up throughout the period of rest betwen successive indication cycles. The manner in which this relay BTP is picked up in an indication cycle will later be described in detail. Between indication cycles, however, relay BTP is maintained energized by a stick circuit that extends from (+) and includes back contact 26 of relay 1V1, back contacts 60 to 64 of relays 1V2 to 1V6 respectively, front contact 27 of the change relay CH, either front contact 28 of relay 1TP or front contact 145 of relay 2TP depending upon which of these track repeater relays is picked up, front contact 91 of relay BTP, and the upper winding of relay BTP, to (—). Upon the occurrence of a change in track occupancy conditions, the relay CH is dropped away as already described. Front contact 27 of relay CH is thereby opened so as to interrupt the stick circuit for relay BTP and this relay then drops away.

If relay BTP has been picked up during the period of rest, relay FTP cannot be maintained energized at such time through the previously described circuit for this relay which included back contact 30 of relay BTP. Under these circumstances, the circuit for energizing the upper winding of relay FTP includes instead back contact 37 of relay L, front contact 30 of relay BTP, and back contacts 31 to 36 of relays 1V1 to 1V6, respectively.

When relay BTP is dropped away by the dropping away of the change relay CH, front contact 30 of relay BTP is opened so as to open the circuit which has been effective to energize the upper winding of relay FTP. A circuit cannot be completed to energize this winding through the back contact 30 of relay BTP because of the open front contact 27 of relay CH. Thus, the dropping away of the change relay CH is effective to cause both the relays BTP and FTP to be dropped away. In the same manner as previously described, a circuit is then completed to energize the lower winding of relay 1V1 so that this relay is picked up. As a result, the upper winding of relay CH is energized to pick this relay up, and also a shunt circuit is completed through front contact 47 of relay 1V1 to energize the line wires 10 and 11.

From the foregoing description it is evident that regardless of whether only relay FTP or both relays FTP and BTP are initially in picked up conditions, both relays are dropped away when relay CH drops away to start a new cycle. Following this, relay 1V1 picks up to shunt the line wires and relay CH is again picked up.

*Start of cycle at central office*

When relay OL picks up in response to the shunt placed on the line wires at a field station (Fig. 3, line K), a stick circuit is established to maintain the lower winding of relay OL energized so that that relay will remain picked up for a limited time. This stick circuit includes back contact 54 of relay CR2, front contact 136 of relay OL, the lower winding of relay OL, to (—). Also, when relay OL picks up, a circuit is completed to energize the winding of relay OZ. This circuit includes back contact 55 of relay CR1, front contact 56 of relay OL, back contact 57 of relay CR2, and the winding of relay OZ, to (—). As soon as relay OZ picks up (see line L), a stick circuit is completed to hold this relay energized, and this stick circuit includes back contact 53 of relay CR2, front contact 84 of relay OZ, and the winding of relay OZ. A circuit through front contact 86 of relay OZ permits relay OL to be energized from the line wires even though relay OZP picks up during a cycle to open its back contact 15.

When relay OZ picks up, a circuit is completed from (+), and through front contact 65 of relay OZ, back contact 66 of relay CR1, and the upper winding of relay V1, to (—). At the same time, however, a circuit is completed through the front contact 65 of relay OZ, back contact 67 of relay CR1, the lower winding of relay V1, and back contacts 68 to 72 of relays V2 to V6 respectively. Thus, for a brief interval both windings of relay V1 are energized so that this relay remains in its dropped away condition.

Another result of the picking up of relay OZ is that a circuit is completed to energize the winding of relay CR1. This circuit includes front contact 58 of relay OZ, back contact 59 of relay CR2, and the winding of relay CR1. As soon as relay CR1 picks up in response to this energization (Fig. 3, line M), it is maintained energized through a stick circuit that includes its own front contact 85, back contact 59 of relay CR2, and the winding of relay CR1. Also, when relay CR1 picks up, both upper and lower windings of relay V1 are deenergized because the back contacts 66 and 67 of relay CR1 which are included in the energizing circuits for the upper and lower windings, respectively, are opened. Instead, a circuit is completed through front contact 65 of relay OZ, front contact 66 of relay CR1, through back contacts 73 to 76 of relays V1 to V4 inclusive, and the upper winding of relay V6, to (—). Since the lower winding of relay V6 cannot be energized at this time because of the open front contact 77 of relay V5, the energization of the upper winding alone causes relay V6 to pick up (see Fig. 3, line N).

When relay V6 picks up, an alternate stick circuit for relay OZ is completed from (+), through front contact 83 of relay V6, front contact 84 of relay OZ, and the winding of relay OZ to (—). As the counting relays V1 to V6 are operated through their various permutations of conditions during a cycle of operation, a stick circuit is always provided through one or more of the contacts of the counting relays to maintain the relay OZ energized. These contacts include, in Fig. 2A, back contact 48 of relay V1, and front contacts 49 to 52 inclusive of the counting relays V1 to V5 respectively as well as the front contact 83 of relay V6. This organization causes the stick circuit for relay OZ to be opened only when the capacity of the counter has been reached, i. e. a count of 31. Or this stick circuit organization for relay OZ may, if desired, provide that relay OZ will release on any other step which may be less than the capacity of the counter and may correspond to the number of indications the system is designed to accommodate.

When relay V6 picks up, a circuit is also completed through its front contact 78 to energize the winding of relay OZP as shown at line O of Fig. 3. This circuit extends from (+), and includes front contact 79 of relay CR1, front contact 80 of relay OZ, front contact 78 of relay V6, and the winding of relay OZP, to (—). As soon as relay OZP picks up, a stick circuit is completed through front contact 79 of relay CR1, front contact 81 of relay OZP and the winding of relay OZP, to (—) to hold relay OZP picked up. During those intervals that relay CR2 is picked up, an alternate stick circuit for relay OZP is provided through front contact 53 of relay CR2. Since relays CR1 and CR2 are both in released conditions for only very brief intervals as shown at lines M and P of Fig. 3 and as will later be described, relay OZP is deenergized only for very short intervals. This relay is, however, provided with sufficient slow releasing characteristics as indicated by the heavy base line for the symbol designating this relay that it will remain picked up throughout a cycle of operation.

With the picking up of relay OZP, a circuit is now completed through the front contact 55 of relay CR1 and front contact 82 of relay OZP to energize the winding of relay CR2 (see line P of Fig. 3). When relay CR2 picks up, its back contact 59 opens so that relay CR1 is deenergized as indicated at line M of Fig. 3. Although relay CR1 is thus deenergized, its armature does not immediately drop away because of its slow releasing characteristics. After a brief interval, however, relay CR1 does drop away and, in doing so, causes its front contact 55 to open so as to deenergize the winding of relay CR2. Relay CR2 is also provided with slow releasing characteristics so as to hold its armature picked up for a brief interval following the deenergization of its winding.

When relay CR2 does drop away, its back contact 59 closes to again energize the winding of relay CR1 so that relay CR1 immediately picks up again as shown at line M of Fig. 3. With relay CR1 picked up, its front contact 55 closes so as to again energize the winding of relay CR2. Upon picking up, relay CR2 causes relay CR1 to be deenergized once more. In this way, the relays CR1 and CR2 are caused to alternately pick up and drop away successively throughout a cycle of operation, with their rate of operation being determined primarily by the amount of slow release time provided for the relays CR1 and CR2. It may be considered that the intermittent operation of relay CR1 causes positive and negative pulses of current to be alternately applied to the line wires. With relay CR1 picked up, line wire 10 becomes positive with respect to wire 11, reversing the normal polarity on the line. For convenience, the line pulse occurring with relay CR1 picked up will be designated as positive; pulses occurring with relay CR1 dropped away as negative.

*Field station operation in cycle*

Each time that this self-coding operation at the central office causes relay CR1 to pick up, the front contacts 13 and 14 of this relay close so that line wire 10 is connected to the (+) terminal of battery 12 and line wire 11 is connected to the (—) terminal of this battery. At each field station, this reversal of line circuit energization permits the flow of current through rectifier 16 in the low resistance, forward direction so that a sufficient flow of current passes through the winding of the line relay L to cause this relay to pick up. Thus, each picking up of relay CR1 at the central office by means of the self-coding operation is effective to reverse the polarity of the line circuit energization so that the line relay L at each field station is picked up as shown at line F of Fig. 3. Each field station line relay may, therefore, be considered as "following" the operation of relay CR1 at the central office.

At the particular field station which initiated the cycle of operation, the first counting relay 1V1 is still in its picked up condition at the time when the line relay L is first energized as a result of the reversed line polarity. The picking up of relay L causes its back contact 37 to open so that the previously described energizing circuit for the lower winding of relay 1V1 is opened and relay 1V1 drops away (Fig. 3, line E).

Under the assumption that one or more of the associated track sections is occupied, the dropping away of relay 1V1 causes a circuit to be completed to energize relay BTP. This circuit extends from the terminal (+) and includes back contact 26 of relay 1V1, back contacts 60–64 of relay 1V2 to 1V6 respectively, front contact 27 of relay CH, a front contact of one of the track repeater relays such as front contact 28 of relay 1TP, back contact 90 of relay FTP, and the winding of relay BTP, to the terminal (—). Upon the picking up of relay BTP, a stick circuit is completed to maintain the upper winding energized through front contact 91 of relay BTP so that relay BTP will remain picked up even though relay FTP is later picked up and opens its back contacts 90.

*Relay binary counter*

With the picking up of relay BTP, the circuits at the field station are properly conditioned so that the relay binary counter can count the operations of the line relay L. However, before describing in detail the manner in which the counting relays operate in response to inputs that are to be counted, it would be well to consider certain general characteristics relating to a binary counter of this kind.

The code chart of Fig. 4 illustrates that the first counting relay such as the relay V1 of Fig. 2A or relay 1V1 of Fig. 2B is operated to its opposite condition in response to every second input step. On the remaining alternate steps, the other counting relays are operated one at a time. The second counting relay 1V2, for example, is operated between opposite conditions on every fourth step. The third relay 1V3 operates between its opposite conditions on every eighth step, and so on.

In transferring from any step to the next, a change in the condition of only one counting relay takes place. Also, when the counting relay corresponding to any particular digit is operated to its opposite condition, the conditions of the relays for the preceding digits as well as those for the succeeding relays follow a set pattern. One general rule is that when any counting relay is to be operated to its opposite condition, all relays for the preceding digits are in dropped away conditions except for the relay corresponding to the immediately preceding digit which is in a picked up condition. For example, in transferring from step eight to step nine, relay V4 should pick up as indicated in Fig. 4. At such time, Fig. 4 shows that of the relays 1V1 to 1V3 corresponding to the preceding digits, both relays 1V1 and 1V2 are in dropped away conditions but relay 1V3 is in a picked up condition. Again, when transferring from step 24 to step 25, relay 1V4 is to be dropped away. Fig. 4 shows that relays 1V1 to 1V3 are in exactly the same conditions they were in when relay 1V4 was picked up on step nine.

The general rule with respect to the relays corresponding to succeeding digits is that an odd number of such relays shall be in picked up conditions when the counting relay in question is to be picked up and that an even number of such relays shall be in picked up conditions when the counting relay in question is to be dropped away. For example, in transferring from step four to step five; relay 1V3, corresponding to the third binary digit, is to be picked up. Of the relays for the succeeding digits, namely the relays 1V4, 1V5, and 1V6, an odd number of these relays is in picked up conditions. In this case, the odd number of relays includes only the relay 1V6. In transferring from step twelve to step thirteen, relay 1V3 is to be dropped away. Of these same relays corresponding to the succeeding digits, under these conditions an even number of these relays is in picked up conditions, namely the relays 1V4 and 1V6. Examination of the code chart of Fig. 4 indicates that these same conditions hold on all the various counts and with respect to all the counting relays. The only exception is on the first step on which the relay 1V6 is picked up. At such time, all the relays in the counter are dropped away.

Under the conditions presently being described, the dropping away of a track relay such as relay 1T upon the occupancy of the associated track section has caused relay FTP to drop away and permitted relay BTP to pick up in response to the first picking up of relay L. As a result, there is completed a circuit from (+) and including front contact 95 of relay BTP, back contact 96 of relay FTP, and front contact 97 of relay L to the wire 98. Throughout the cycle of operation, relay FTP remains dropped away and relay BTP remains picked up so that, as relay L is alternately picked up and dropped away in response to the changes of polarity applied to the line wires, contact 97 of this relay operates between its front and back positions so as to apply energy alternately to wire 98 and wire 99. Also, each time that relay L is picked up, a circuit is completed from (+) and through its front contact 37, and front contact 100 to energize wire 101. Each time that relay L is dropped away, a circuit is completed through the back contact 37 of relay L and back contact 38 of relay FTP, to energize wire 102.

It should be remembered that, as the field station counter operates to count the actuations of the line relay L, the similar counter at the central office is counting the actuations of relay CR1. Since the line relay L, in effect, follows the operation of relay CR1, the central office and field station counters keep in step with each other during an indication cycle. It will now be described how the alternate picking up and dropping away of the relay L results in operation of the relay binary counter in accordance with the code chart of Fig. 4.

In the binary counter of this invention, the upper winding of each neutral type counting relay is energized each time that relay is to be actuated, regardless of whether the relay is to be picked up or dropped away. When the relay is to be picked up, the lower winding is prevented from being energized so that the energization of the upper winding alone can be effective to pick up its armature. When a counting relay is once picked up, a stick circuit is provided to maintain it in that condition. When the counting relay is to be dropped away, a circuit is completed through its lower winding which is poled oppositely with respect to the opposite winding so that the relay drops away.

As already described, one condition that must be fulfilled each time a counting relay is either picked up or dropped away is that the relay for the immediately preceding digit be picked up and the relays for all other preceding digits be dropped away. Thus, the energizing circuit for each winding of a counting relay includes a front contact of the relay for the immediately preceding digit in series with back contacts of the relays for all other preceding digits.

The additional condition imposed with respect to the operation of a counting relay relates to the condition of the relays for the succeeding digits and determines whether, on a particular step, the relay is to be either picked up or dropped away. Thus, a reiterative network is provided which is effective only with respect to the energization of the lower winding of each relay. This network prevents the lower winding of a counting relay from being energized when an odd number of the relays for the succeeding digits are in picked up conditions. Conversely, this network allows the lower winding of a relay to be energized so that the relay will drop away when an even number of the relays for the succeeding digits is in picked up conditions. Such energization of the lower winding is, of course, possible only when the relays for the preceding digits are in their prescribed conditions as already described.

Referring now to the counting circuit organization shown in Fig. 2B, it can be seen that the network included in the energizing circuit for the upper winding of each relay is so organized as to ensure compliance with the required condition relating to the relays for the preceding digits. Thus, the energization of the wire 98 upon the picking up of line relay L can be effective to energize the upper winding of relay 1V4 only if relays 1V1 and 1V2 are dropped away and relay 1V3 is picked up. Under such conditions, a circuit is completed from wire 98 and through back contact 103 of relay 1V1, back contact 104 of relay 1V2, front contact 105 of relay 1V3, and the winding of relay 1V4, to (—).

The energizing circuit for the lower winding of each counting relay is so organized that the proper conditions with respect to both the relays for the preceding and for the succeeding digits must be met in accordance with the general principles previously described in order that the lower winding can be energized. Thus, energization of wire 101 can only result in energization of a left-hand terminal of the lower winding of relay 1V4 if relays 1V1 and 1V2 are dropped away and relay 1V3 is picked up. Under these conditions, the energy appearing on wire 101 can be applied through back contacts 107 and 108 of relays 1V1 and 1V2 respectively and through front contact 109 of relay 1V3, to the left-hand terminal of the lower winding of relay 1V4.

The right-hand terminal of the lower winding of each counting relay can be connected to (—) only if an even number of the relays for the succeeding digits is in a picked up condition. With respect to the lower winding of relay 1V2, for example, it will be assumed that an odd number of the relays for the succeeding digits is picked up. For purposes of illustration it will be assumed that relays 1V3, 1V5, and 1V6 are picked up. Under these circumstances, the right-hand terminal of the lower winding of relay 1V2, is connected through front contact 40 of relay 1V3, back contact 121 of relay 1V4, front contact 122 of relay 1V5, to wire 116, which cannot be connected to (—) because of the open back contact 43 of relay 1V6. If, on the other hand, an even number of the relays for the succeeding digits is picked up, such as relays 1V4 and 1V5, for example, then the right-hand terminal of the lower winding of relay 1V2 is connected through back contact 40 of relay 1V3, front contact 41 of relay 1V4, front contact 122 of relay 1V5, and through back contact 43 of relay 1V6, to (—).

A step-by-step account of the operation of the counter for the first few steps of a cycle will be given to illustrate in detail the way in which the relays are sequentially actuated according to the code chart of Fig. 4.

When relay L picks up the first time, energy is applied to wire 98 and through back contacts 103 to 106 inclusive of relays 1V1 to 1V4 respectively to energize the upper winding of relay 1V6. At the same time, wire 101 is energized; but, even though relays 1V1 to 1V4 are dropped away at this time so that their back contacts 107 to 110 respectively are closed, the open front contact 111 of relay 1V5 prevents the lower winding of relay 1V6 from being energized. Therefore, only the upper winding of this relay is energized so that it picks up at this time as shown at line H of Fig. 3. Relay 1V6 is thus picked up on this first step at a time when all the other counting relays are dropped away. As previously mentioned, this first actuation of relay 1V6 is an exception to the rule relating to the conditions existing with respect to the relays for the preceding digits.

The code chart of Fig. 4 shows that relay 1V1 is to be operated from one condition to the other upon each dropping away of the line relay L. This relay 1V1 is, according to the general principles of operation already described, to be picked up each time relay L is dropped away provided that on such step an odd number of the relays for the succeeding digits are in picked up condition. Conversely, relay 1V1 should be dropped away on those steps when relay L drops away provided that an even number of the relays for the succeeding digits are in picked up condition. As shown in Fig. 2B, the upper winding of relay 1V1 is energized each time that relay L drops away and closes its back contact 97. Each time that relay L drops away energy is also applied to wire 102 through front contact 100 of relay BTP. A circuit can be completed through this lower winding only if certain conditions are met, however. Thus, the reiterative network comprising contacts of the relays 1V2 to 1V6 permits the right-hand terminal of relay 1V1 to be connected to (—) only on steps during which an even number of the relays 1V2 to 1V6 is picked up. Under such conditions, the lower winding of relay 1V1 is energized as well as the upper winding so that the net relay flux is substantially zero and the relay drops away. If an odd number of the relays for the succeeding digits is picked up, the right-hand terminal of the lower winding of relay 1V1 is not connected to the (—) voltage terminal. Under these circumstances, only the upper winding of relay 1V1 is energized so that this relay then picks up. It can thus be seen that this reiterative network causes the operation of relay 1V1 to be in accordance with the code chart of Fig. 4.

As an example, upon the dropping away of the line relay L for the first time, an odd number of the relays for the succeeding digits is in picked up condition; namely, the relay 1V6 which was picked up when relay L picked up the first time as indicated at lines F and H of Fig. 3. The dropping away of relay L results in the energization of the upper winding of relay 1V1 as this occurs upon each dropping away of this relay L. At the same time, wire 102 is energized. The right-hand terminal of the lower winding of relay 1V1 is connected through back contact 39 of relay 1V2, back contact 40 of relay 1V3, back contact 41 of relay 1V4, back contact 42 of relay 1V5, to the wire 116. With back contact 43 of relay 1V6 now open, a circuit cannot be completed to connect the right-hand terminal of the lower winding of relay 1V1 to the terminal (—) so that the lower winding of relay 1V1 is not energized. With only the upper winding of this relay energized, it then picks up. As soon as relay 1V1 picks up, a circuit is completed from the wire 117 which is continually energized throughout a counting cycle and through front contact 118 of relay 1V1 to maintain the energization of this upper winding.

When relay L drops away the second time, the upper winding of the relay 1V1 is again energized. Since an even number of the relays for the succeeding digits, i. e. relays 1V2 and 1V6, is in picked up condition at this time, relay 1V1 should, according to the code chart of Fig. 4, be dropped away. The dropping away of relay L causes wire 102 to be energized. The right-hand terminal of the lower winding of relay 1V1 is now connected through front contact 39 of relay 1V2, back contact 120 of relay 1V3, back contact 121 of relay 1V4, back contact 122 of relay 1V5, and through the front contact 123 of relay 1V6, to (—). A circuit is thus completed to energize the lower winding of relay 1V1 so that with both windings of this relay now energized, the net flux is reduced to such a low level that relay 1V1 drops away.

On the remaining alternate steps when relay L picks up, the various other counting relays operate in the manner described according to the code chart of Fig. 4. For example, when relay L picks up for the second time, energy is again applied to wire 98 and then through front contact 103 of relay 1V1 and the upper winding of relay 1V2, to the terminal (—). Although there is energy applied at this time to wire 101 and through front contact 107 of relay 1V1 to the left-hand terminal of the lower winding of relay 1V2, the right-hand terminal of this lower winding now cannot be connected to (—), however, because of the open back contact 43 of relay 1V6. The lower winding of relay 1V2 is, therefore, deenergized so that relay 1V2 can pick up in response to the energization of its upper winding.

*Transmission of indications*

At any field station desiring to transmit an indication of track occupancy to the central office, the binary counter operates step-by-step in response to the alternate picking up and dropping away of the line relay L at such field station. On a particular one or more preselected steps of the cycle, a shunt is placed on the line wires at such field station.

The circuit organization at each field station makes it possible for a shunt to be applied to the line wires only when the polarity of line energization is such that all the field station line relays are dropped away, i. e. the negative polarity. This is necessary in order that the application of a shunt will not deprive stations more remote from the central office of line energy required to pick up their line relays. The line relays at such remote field stations must be allowed to operate properly so as to permit the desired operation of the associated counters. It is on the even numbered or negative steps (see Fig. 4) that the line polarity is such as to cause all the field station line relays to drop away; consequently, it is only on these even-numbered steps that a shunt can be applied at the various field stations.

It will be assumed that at the field station shown in Fig. 2B, an indication of track occupancy for the track section relating to track relay 1T may be transmitted on the second step and that a condition of occupancy with respect to the track section associated with track relay 2T may be transmitted on the fourth step.

As shown in Fig. 4, on the second step relays V2 to V5 are dropped away while relay V6 is picked up. Thus, it is possible on such step for a circuit to be completed from the wire 11, through rectifier 44 in the forward direction, front contact 45 of relay BTP, back contact 125 of relay L, front contact 126 of relay 1TP, back contacts 127 to 130 of relays 1V2 to 1V5 respectively, front contact 131 of relay 1V6, to line wire 10.

Relays 1V2 to 1V6 do not change their conditions between steps one and two; only relay 1V1 is operated between these successive steps. The same condition prevails between steps three and four, five and six, etc. Thus, it may be considered that the condition of relay 1V1 merely distinguishes between the steps of such successive pairs. A line shunt cannot be applied on the odd-numbered step of such a pair because the shunt circuit includes back contact 125 of relay L and relay L is in a picked up condition during each odd step. Consequently, the line shunt circuit need not include contacts of the first counting relay 1V1.

On the fourth step, a similar circuit may be provided to shunt line wires 10 and 11 if relay 2TP has been picked up by the releasing of the track relay 2T. This shunting circuit differs only to the extent that it includes front contact 132 of relay 2TP and front contact 127 of relay 1V2 rather than the front contact 126 and back contact 127 of relays 1TP and 1V2 respectively. In a similar way, a shunting circuit can be provided for the line wires on any desired even-numbered step of a cycle by properly selecting the contacts of the counting relays included in such shunting circuit.

Reception and registering of indications

The relay binary counter for the central office which includes the counting relays V1 to V6 operates in succession through its various steps as relay CR1 alternately picks up and drops away. Since the manner of operation of this central office counter is the same as that described for a typical field station as shown in Fig. 2B, it is not necessary to describe it in detail. The counter at the central office counts the number of polarity reversals of line energization in the same way as does the counter at the field station so that any field station counter that is operating throughout an indication cycle is always in step with the similar counter at the central office.

At the central office, the detection of line shunts applied by the various field stations is the function of relay OL. The normal amplitude of line current that exists when the polarity of line energization is that produced when relay CR1 is dropped away is not effective to pick up the relay OL even though such line current energizes the upper winding of this relay. However, when a field station shunts the line wires during a particular step in the manner just described, the current applied by battery 12 to the line wires 10 and 11 sufficiently increases the current through the upper winding of relay OL to cause this relay to pick up.

After relay OL has been picked up by a shunt occurring at a field station, the subsequent picking up of relay CR1 at the central office to terminate the negative line pulse causes a reversal of line energy polarity so that relay L at the shunting field station is picked up and opens the field station shunt circuit at back contact 125 of relay L. Despite this removal of the line shunt, relay OL is prevented from dropping away at this time by a stick circuit which is completed through front contact 135 of relay CR1, front contact 136 of relay OL, and the lower winding of relay OL, to (—).

The central office binary counter is advanced a step each time relay CR1 drops away to initiate a negative line pulse and is advanced another step when relay CR1 picks up to terminate the negative line pulse. At the beginning of each negative line pulse, the shunt detecting relay OL is in its dropped away condition but may be picked up after an interval if a line shunt is applied by some field station. The length of this interval is dependent not only upon the operating times of various relays but also upon line propagation time and may thus vary quite considerably depending upon the distance between central office and field station. In view of this indeterminate condition of relay OL during an even-numbered step of the central office counter, it is not practicable to transfer an indication received on such even-numbered step to the corresponding indication relay at such time. The registering of received indications onto the respective indication relays is facilitated by storing an indication received on any even step until the immediately following odd-numbered step at which time it is transferred to the appropriate indication relay.

The manner in which a particular indication relay is selected in accordance with the condition of the relay binary counter at the central office is shown in detail in Fig. 5. Fig. 2A illustrates that a circuit when completed through the network selection circuits to the left-hand terminal of a particular indication relay is then completed by connecting the right-hand terminal of such indication relay over wire 140 through contact 141 of relay OL to the terminal (—). The failure of relay OL to be picked up because a shunt is not applied by a field station on any even-numbered step causes current of one particular polarity to be applied on the next step to the winding of the corresponding indication relay. When relay OL does pick up on an even-numbered step because a line shunt was applied at a field station, current of the opposite polarity is applied on the next step to the winding of the corresponding indication relay.

For example, with relay OL dropped away, current is applied from (+) through back contact 141 of relay OL, over wire 140, to the right-hand terminal of each indication relay. However, only a particular one of such indication relays has its left-hand terminal connected on an odd-numbered step through the selection network to wire 139 and then through front contact 138 of relay CR1 and back contact 137 of relay OL, to the terminal (—). Under these conditions, the particular indication relay is operated to one of its possible conditions. Consequently, with relay OL dropped away, the direction of current through the particular indication relay selected is from right to left. Obviously, if relay OL were picked up so that its front contacts 137 and 141 would be closed, the indication relay would be energized with the opposite polarity. Since each indication relay is of the magnetic stick type, its armature is operated one way or the other in accordance with the polarity of its energization and remains in such operated condition until energized with the opposite polarity. It will be assumed that a flow of current from left to right through a winding causes the relay armature to pick up.

As previously described, an indication received from a field station on an even-numbered step is not transferred to the corresponding indication relay until the next step. This is accomplished by including front contact 138 of relay CR1 in the selecting network. Since relay CR1 is only picked up on an odd-numbered step, no indication relays can be energized during even-numbered steps when the indications are being received from the various field stations.

The picking up of relay CR1 not only causes energy to be applied to wire 139 and thus selectively to the various indication relays, but also causes the relay binary counter at the central office to advance one step. It is desirable, of course, that, following the picking up of relay CR1 and before the counter has operated to a new condition, energy not be erroneously applied to the wrong indication relay. If, for example, relay CR1 picks up at the beginning of an odd-numbered step so that wire 139 is energized, and if relay V4 is to be operated also in response to this picking up of relay CR1, it is desired that energy not be applied momentarily to one indication relay prior to the time relay V4 is operated and then to another indication relay after relay V4 has operated. For this reason, the selecting network shown in Fig. 5 is organized so that each indication relay is positively energized on its particular step and no other indication relay is energized even momentarily on such step.

This function is accomplished by omitting, from the circuit path for any indication relay, contacts of the particular counting relay that is to be actuated when relay CR1 picks up. The code chart of Fig. 4 illustrates, for example, that, with respect to an indication received on step eight and transferred to the corresponding indication relay TK4 on step nine, the only change in the counting relays is that relay V4 is picked up. On step nine only the counting relays V3, V4, and V6 are picked up. Fig. 5 shows that on step nine, energy is applied from wire 139 through back contacts 150 and 151 of relays V1 and V2, front contact 152 of relay V3, back contact 153 of relay V5, and front contact 154 of relay V6, to the winding of relay TK4. It is to be noted that this circuit does not include contacts of the counting relay V4 since this relay is actuated as relay CR1 picks up to complete this circuit for energizing relay TK4. The selecting network of Fig. 5 is organized similarly with respect to all the other indication relays so that the circuit for energizing any indication relay does not include contacts of the counting relay actuated on the step corresponding to that indication relay. Omission of the contacts of such counting relay can never result in the operation of the wrong indication relay since the change in condition of the particular counting relay omitted serves only to distinguish between the conditions on that particular odd-numbered step and the immediately preceding even-numbered step, and with relay CR1 dropped away on an even-numbered step, no indication relay can be energized.

Depending upon the operated condition of each indication relay, a corresponding indication lamp is selectively illuminated. For example, an indication of track occupancy for the particular field station relating to indication relay TK12 will cause this relay to pick up. A circuit is then completed from (+) and through front contact 142, and lamp TE12, to (−). When the track section associated with this particular indication relay is not occupied, no shunt is applied to the line wires on the corresponding digit of the indication code so that relay TK12 remains dropped away and lamp TE12 is unilluminated.

Lockout of non-transmitting field stations

When the track relays associated with a particular field station are all picked up, thereby indicating that the corresponding track sections are all unoccupied, it is desired that there be no line shunts applied by such field station during an indication cycle. By thus preventing the field station from transmitting a line shunt to the central office, the associated indication relays will not be picked up as has been described and the proper conditions of non-occupancy for the track sections will then be displayed at the central office. Under these conditions, it is not required that the relay binary counter at the field station keep track of the number of operations of the line relay L since it is not desired that the field station should apply a shunt at any part of the cycle. Accordingly, the relay binary counter at such field station is prevented from responding.

More specifically, when all of the track sections associated with a particular field station are unoccupied, the corresponding track relays are picked up and the related track repeater relays are dropped away. Under such conditions, both front contacts 28 and 145 of relays 1TP and 2TP respectively are open so that it becomes impossible for relay BTP to pick up. With relay BTP dropped away, its front contact 95 is opened so that the wires 98 and 99 cannot be alternately energized as the line relay L picks up and drops away during an indication cycle. Consequently, the relay binary counter at such field station is prevented from responding to the operations of the line relay, and unnecessary operation and resulting wear of the counting relays is avoided. Under these circumstances, with relays BTP, 1TP and 2TP all dropped away so that their front contacts 45, 126, and 132 respectively are opened, it is impossible for a shunt to be applied to the line wires 10 and 11 even if the counting relays were operated throughout a cycle of operation.

Prevention of cycle starts during cycle

If an indication cycle is in progress, it is impossible for any other field station to initiate an indication cycle by shunting the line until the first cycle has been completed. According to the description already given, an indication cycle is initiated by the dropping away of relay CH which causes relay FTP to drop away. If an indication cycle is already in progress, however, relay FTP is prevented from dropping away. If only relay FTP and not relay BTP at the particular field station is picked up, each closure of front contact 160 of relay L causes energy to be applied through back contact 163 of relay BTP, front contact 164 of relay FTP, and the lower winding of relay FTP, to (−). At the same time, a circuit is completed from (+), through front contact 160 of relay L, capacitor 161, resistor 162, to (−) to charge capacitor 161. Each time relay L drops away, the charged capacitor 161 discharges through the circuit just described into the lower winding of relay FTP. Thus, the continued picking up and dropping away of relay L in an indication cycle when such cycle was started prior to the dropping away of relay FTP is effective to supply energy through a front contact stick contact of this relay to maintain it picked up. Of course, if relay FTP drops away to start a cycle before relay L picks up, this holding circuit for relay FTP is not effective because of the open front contact 164 of this relay.

If, on the other hand, both relays FTP and BTP are picked up at the beginning of an indication cycle started by some other field station, the continuous picking up and dropping away of relay L causes energy to be applied instead through front contact 163 of relay BTP and the lower winding of this relay to the terminal (−) so that relay BTP remains picked up. This prevents a cycle-initiating shunt from being applied to the line wires through back contact 45 of relay BTP.

In this latter case where relay BTP was picked up and then held in this condition throughout the duration of an indication cycle initiated at some other field station, it is still desired that an indicating shunt be placed on the line wires at the proper time in the cycle to indicate the track occupancy conditions. Thus, the first picking up of line relay L not only supplies energy to the lower winding of relay BTP through front contact 160 of relay L, but also opens the energizing circuit for the upper winding of relay FTP at back contact 37 of relay L. At the same time, the closure of front contact 97 of relay L causes the picking up of counting relay 1V6. Consequently, when relay L drops away, the upper winding of relay FTP is prevented from being energized because of open back contact 36 of relay 1V6. With relay BTP held picked up and relay FTP dropped away, the counter can respond to the operations of relay L so that the line may be shunted at the proper time. Throughout the entire cycle, one of the contacts 31 to 36 of relays 1V1 to 1V6 is open thereby preventing the upper winding of relay FTP from being energized.

A change in track occupancy conditions causes a new indication cycle to be started as a result of the dropping away of the change relay CH. If the dropping away of relay CH occurs during a cycle, however, relay CH is prevented from picking up until the current cycle has completed. In other words, a cycle-start as represented by the dropping away of relay CH and occurring in an indication cycle is delayed until the cycle has completed. If relay FTP is held up throughout a cycle by the intermittent operation of line relay L, the various counting relays are prevented from operating so that front contact 26 of relay 1V1 cannot close to pick up relay CH by energizing its upper winding. On the other hand, if relay FTP is in a dropped away condition throughout an indication cycle and relay BTP is picked up, relay CH is prevented from picking up during the cycle by reason of the open back contact 23 of relay BTP. By thus maintaining relay CH dropped away, a new indication cycle is initiated when the current one is completed in the same manner as previously described for a typical indication cycle.

*End-of-cycle operation*

Throughout an indication cycle relay OZ at the central office is maintained energized through a stick circuit which includes its own front contact 84 and one or more of the contacts 48–52 and 83 of the counting relays V1 to V6 respectively. The central office apparatus shown in Fig. 2A is so organized that a stick circuit is provided to hold relay OZ picked up until the counting capacity of the relay binary counter is reached. Thus, if six counting relays are used and it is desired to provide for the full capacity of 31 different field stations, the arrangement of contacts in the stick circuit for relay OZ as shown in Fig. 2A will continually be effective to maintain relay OZ energized until the capacity of the counter has been reached. It is not until the sixty-third step (see Fig. 4) that relay V2 drops away at a time when relay V1 is picked up and relays V3 to V6 are all dropped away. This causes back contact 48 of relay V1 to be open at the same time that front contacts 49 to 52 and 83 of relays V2 to V6 respectively are also all open, thereby opening the stick circuit which has been effective to hold relay OZ energized. Since relay CR2 is picked up at this time, the stick circuit for relay OZ which is at times effective through back contact 53 of relay CR2 and front contact 84 of relay OZ is now also open so that relay OZ can drop away.

The usual self-coding operation is still effective at this time in the cycle so that the picking up of relay CR2 causes relay CR1 to be deenergized when back contact 59 of relay CR2 is opened. Also, the dropping away of relay CR1 causes its front contact 55 to open so that relay CR2 is deenergized. With relay OZ now dropped away, however, the dropping away of relay CR2 cannot cause relay CR1 to pick up because of the open front contact 58 of the relay OZ. Since relay CR1 cannot pick up, its open front contact 55 also prevents relay CR2 from being energized. In this way, the self coding operation which is continually effective during the cycle is terminated.

When relay CR2 drops away, its front contact 53 opens to thereby open the stick circuit for relay OZP so that this relay also drops away after an interval as determined by the amount of slow release time provided for this relay. This slow release time of relay OZP causes the upper winding of relay OL to be open-circuited from the time that relay OZ drops away to open its front contact 86 until relay OZP drops away to close its back contact 15, so that this relay OL cannot respond to a cycle-initiating shunt that may be applied by some other field station. Thus, the slow release characteristics of relay OZP are effective in establishing a minimum time spacing between successive cycles to thereby allow the various relays at the field stations to be restored to normal conditions before a new indication cycle is started.

Although the contacts 48 to 52 and 83 of the counting relays V1 to V6 are so organized that relay OZ will not drop away until the counting capacity of the counter has been reached, these contacts may equally well be arranged so that relay OZ will drop away at some earlier time in an indication cycle. Thus, in a particular installation, the number of field stations included may be less than the capacity of the central office so that it may be desirable to terminate a cycle when sufficient steps have been taken to make it possible for all field stations to transmit their indications. Under these circumstances, the various contacts of the counting relays included in the stick circuit for relay OZ will be arranged so that relay OZ will drop away on the desired step in the cycle. The self-coding operation will then be terminated in the usual way and the sequence of relay operations will be the same as just described.

At any field station that has been conditioned by reason of track occupancy conditions to shunt the line on one or more steps of the cycle, the relay FTP is dropped away and the relay BTP picked up. If the central office has been so organized that the binary counter will count through its entire capacity before the self coding operation ceases, the correspondnig binary counter at the field station will also operate throughout its various steps until its capacity has been reached. Consequently, on the sixty-fourth step, the dropping away of the line relay L will cause counting relay 1V1 to drop away with the result that all the counting relays 1V1 to 1V6 will then be dropped away. When this occurs, a circuit will be completed through back contact 37 of relay L, front contact 30 of relay BTP, the upper winding of relay FTP and the back contacts 31 to 36 of relays 1V1 to 1V6 respectively. The circuit thus established will cause relay FTP to pick up. Until relay FTP picks up, circuits are completed to energize both windings of relay 1V1. Since these circuits have already been described in detail, they will not be repeated. Energization of both windings results in opposing magnetomotive focus so that relay 1V1 remains dropped away.

With relay FTP picked up, its back contacts 96 and 38 will be opened so as to make further operation of the counting relays impossible. Also, the alternate closing and opening of front contact 160 or relay L, will cease so that the lower winding of relay BTP will no longer be energized. The upper winding of this relay will now, however, be energized through back contacts 26 and 60–64 of relays 1V1 to 1V6 respectively, front contact 27 of relay CH, either front contact 28 of relay 1TP or front contact 145 of relay 2TP, front contact 91 of relay BTP, and the upper winding of relay BTP.

When the apparatus at the central office is organized in a manner to terminate the self-coding operation before the capacity of the central office counter has been reached, the termination of the cycle at the field station occurs in a somewhat different manner than just described. Under these circumstances, the counter at the field station which keeps in step with the central office counter has one or more of its counting relays in picked-up conditions when the central office stops pulsing the line wires. A circuit can therefore not be completed to energize the upper winding of relay FTP through back contacts 31 to 36 in series of relays 1V1 to 1V6 respectively. However, since relay BTP is held up during the cycle because of the intermittent closure of front contact 160 of relay L, the failure of relay L to pick up and drop away now causes the lower winding of relay BTP to be deenergized.

Since one or more of the counting relays is picked up at this time, a circuit can also not be completed to energize the upper winding of relay BTP through back contact 26 of relay 1V1 and the series-connected contacts 60 to 64 of relay 1V2 to 1V6 respectively. With both windings of relay BTP thus deenergized, front contact 95 of relay BTP is opened so that energy is removed from wire 117. As a result, stick circuit energy cannot be provided for the counting relays 1V1 to 1V6 and any of these relays still picked up then drops away.

With the counting relays all dropped away, a circuit for energizing the upper winding of relay BTP is completed from (+), through back contact 26 of relay 1V1, back contacts 60 to 64 of relays 1V2 to 1V6 respectively, front contact 27 of relay CH, front contact 28 of relay 1TP or front contact 145 of relay 2TP depending upon which of these track repeater relays is picked up, back contact 90 of relay FTP, and the upper winding of relay BTP, to (—). When relay BTP picks up, it is held up through a stick circuit including its own front contact 91.

As soon as relay BTP picks up, a circuit is completed to energize relay FTP. This circuit includes back contact 37 of relay L, front contact 30 of relay BTP, the upper winding of relay FTP, and back contacts 31 to 36 of relays 1V1 to 1V6 respectively. In this way, the various relays at the field station are restored to their proper conditions in readiness for a new indication cycle.

This ability of the field station apparatus to properly restore itself when the central office ceases its transmission even though this occurs before the field station counter has reached its counting capacity makes possible another advantageous feature of the present invention. Thus, if for any reason the counter at a field station does not count properly during a cycle because the received code is distorted or for any other reason, the counting relays at such field station will still be restored to their normal condition at the end of the cycle. This feature makes it possible for the counter to be in its proper condition when a subsequent cycle is begun.

As is already apparent from the description given, the cessation of operation of line relay L at the end of a cycle causes the lower winding of relay BTP to be deenergized. With one or more of the counting relays still picked up, neither the upper winding of relay FTP nor the upper winding of relay BTP can be energized so that relay BTP drops away. The opening of front contact 95 of relay BTP then causes any counting relay still in a picked up condition to drop away. The simultaneous opening of front contact 21 of relay BTP prevents the lower winding of relay 1V1 from being energized so that this relay cannot be picked up. If relay 1V1 is already in its picked-up condition when the cycle terminates without the counter having reached its proper count, the lower winding of relay 1V1 will be energized through its own front contact 22. The magnetomotive force resulting from this energization opposes that which was previously effective on the upper winding so that the armature of relay 1V1 is caused to drop away. When front contact 22 opens, the lower winding is also deenergized, thereby assuring that this relay will remain dropped away. With all the counting relays dropped away, it is then possible for the relay BTP to be picked up and, following this, the relay FTP can pick up so that all the field station relays are restored to their proper condition prior to the beginning of a new cycle.

Having described a relay code communication system as one specific embodiment of this invention, we desire it to be understood that this form is selected to facilitate the disclosure of the invention rather than to limit the number of forms it may assume; also, various modifications, adaptations, and alterations may be applied to the specific form shown to meet the requirements of practice without in any manner departing from the spirit or scope of this invention.

What we claim is:

1. A shunt type direct-current code communication system comprising, a plurality of field stations connected by a pair of line wires to a central office, means at said central office for successively applying step demarcating pulses of direct current to said line wires, circuit means including a relay binary counter at each field station for selectively shunting said line wires on a preselected one of said steps of a cycle of operation designated for the associated field station, a relay binary counter at said central office also being effective to count the number of said pulses applied to said line wires, and means governed by said relay binary counter at said control office for transferring a received indication from a particular field station to an indication storage means provided at said central office for said particular field station.

2. In a shunt type code communication system, a pair of line wires connecting a central office to a plurality of field stations, means at said central office for alternately applying first one and then the other polarity of direct current to said line wires successively to thereby demarcate successive steps of a cycle of operation, counting circuit means at said central office and at each field station for counting said steps, means at each field station for selectively shunting said line wires on a selected step designated for such field station as determined by the associated counting circuit means, indication registration means at said central office for the various field stations being sequentially selected by said central office counting circuit means and being selectively controlled in accordance ith whether a shunt was received from the corresponding field station on the step of said cycle designated for such field station.

3. A shunt type code communication system for transferring indications from a plurality of field stations to a central office over a pair of line wires comprising, means at said central office for alternately and successively energizing said line wires with first one and then the opposite polarity of direct current during a cycle, a line relay at each field station being actuated between opposite conditions alternately in response to the successively opposite polarities of energization applied to said lines wires, counting circuit means at each field station and at said central office for counting the actuations of said line relay, means at each field station governed by the operated condition of the associated counting circuit means on a predetermined step for selectively shunting said line wires in accordance with the indication to be transmitted on said step, indication storage means at said central office for each field station, indication registering means at said central office governed by the actuated condition of said counting circuit means at said central office and selectively acting on the indication storage means for the various stations in accordance with whether a shunt occurred on the step associated with the respective station.

4. A shunt type code communication system for transferring indications from a plurality of field stations to a central office over a pair of line wires comprising, means at said central office for applying direct current to said line wires, pole changing means at said central office for alternately and successively reversing the polarity of line energization, a relay binary counter at said central office governed by said pole changing means and having its counting relays operated successively one at a time through their various permutations of conditions, means at each of said field stations for selectively shunting said line wires on predetermined steps of said cycle designated for such station in accordance with the indication to be transmitted, means at said central office for storing indications received on one step of said cycle until the next step, indication storage means for each field station at said central office, selecting network means governed by said binary counter for routing received indications to the proper indication storage means associated with the corresponding field station, said selecting network including only contacts of said counting relays not operated by said pole changing means between said one step and said next step of said cycle of operation, whereby only the properly designated indication storage means receives the indication from the associated field station.

References Cited in the file of this patent

UNITED STATES PATENTS

| | | |
|---|---|---|
| 1,632,106 | Zogbaum | June 14, 1927 |
| 1,995,272 | Brixner | Mar. 19, 1935 |
| 2,067,145 | Powell | Jan. 5, 1937 |
| 2,067,151 | Dicke | Jan. 5, 1937 |
| 2,114,255 | Powell | Apr. 12, 1938 |
| 2,303,875 | Baughman | Dec. 1, 1942 |
| 2,397,401 | Baughman | Mar. 26, 1947 |